(12) United States Patent
Schülke et al.

(10) Patent No.: US 6,663,113 B2
(45) Date of Patent: Dec. 16, 2003

(54) SYSTEM AND METHOD FOR REDUCING STOPPING DISTANCE AND IMPROVING TRACTION IN MOTOR VEHICLES

(75) Inventors: Armin Schülke, Hardthof (DE); Armin-Maria Verhagen, Schwieberdingen (DE); Roland Stoller, Fellbach (DE)

(73) Assignee: Robert Bosch GmbH, Stuttgart (DE)

( * ) Notice: Subject to any disclaimer, the term of this patent is extended or adjusted under 35 U.S.C. 154(b) by 111 days.

(21) Appl. No.: 09/989,356

(22) Filed: Nov. 20, 2001

(65) Prior Publication Data

US 2002/0109309 A1 Aug. 15, 2002

Related U.S. Application Data

(63) Continuation-in-part of application No. 09/356,075, filed on Jul. 16, 1999, now abandoned.

(30) Foreign Application Priority Data

Oct. 9, 1998 (DE) .......................................... 198 46 500

(51) Int. Cl.$^7$ ............................................... B60G 81/00
(52) U.S. Cl. .................... 280/5.505; 303/146; 303/148; 303/149; 303/150
(58) Field of Search .................. 280/5.505; 303/113.2, 303/144, 146, 148, 149, 150

(56) References Cited

U.S. PATENT DOCUMENTS

| | | | |
|---|---|---|---|
| 4,345,796 A | * 8/1982 | Reinecke | 303/122.06 |
| 4,657,310 A | * 4/1987 | Klein | 303/9.62 |
| 4,796,911 A | 1/1989 | Kuroki et al. | |
| 4,892,329 A | 1/1990 | Kozaki et al. | |
| 4,962,943 A | 10/1990 | Lin | |
| 5,015,041 A | * 5/1991 | Kuwana et al. | 303/146 |
| 5,058,018 A | * 10/1991 | Kuwana et al. | 701/73 |
| 5,077,672 A | 12/1991 | Nobumoto et al. | |
| 5,135,290 A | 8/1992 | Cao | |

(List continued on next page.)

FOREIGN PATENT DOCUMENTS

| | | |
|---|---|---|
| DE | 196 01 826 | 1/1996 |
| DE | 198 08 673 | 4/1999 |
| EP | 0508640 | 10/1992 |
| JP | 58-137172 | 7/1983 |
| JP | 60-142321 | 6/1985 |
| JP | 62-221909 | 9/1987 |
| JP | 02-270617 | 11/1990 |
| JP | 04-027615 | 1/1992 |
| JP | 06-032134 | 2/1994 |
| JP | 06-249927 | 9/1994 |
| WO | WO 99/67100 | 12/1999 |

OTHER PUBLICATIONS

*Intelligence for the Undercarriage*, Design Electronics, p. 9, No. 17, Aug. 5, 1992.

Primary Examiner—Paul N. Dickson
Assistant Examiner—Toan C To
(74) Attorney, Agent, or Firm—Baker & Daniels

(57) ABSTRACT

A method for improving the traction between a road surface and a motor vehicle having a pair of front wheels and a pair of rear wheels which engage the road, each front wheel mounted on a front axle, each rear wheel mounted on a rear axle, one of the axles being a driven axle, and a two-part undercarriage roll stabilizer system including a front and a rear undercarriage stabilizer, each the undercarriage stabilizer comprising an actuating drive operatively coupled to a the pair of wheels, and for reducing the stopping distance along the road in which the motor vehicle can be stopped. The method includes: determining a coefficient of friction between at least two wheels and the road surface; comparing the coefficients of friction; and tensioning the actuating drives diagonally, the wheel contact forces between diagonally opposite wheels and the road surface thereby being one of increased and decreased in response to the determined coefficient of friction between a wheel and the road surface. Also, a system for carrying out this method in a motor vehicle.

7 Claims, 2 Drawing Sheets

U.S. PATENT DOCUMENTS

| | | |
|---|---|---|
| 5,161,822 A | 11/1992 | Lund .......................... 280/772 |
| 5,178,406 A | 1/1993 | Reynolds .................... 280/723 |
| 5,186,486 A | 2/1993 | Hynds et al. |
| 5,205,371 A | 4/1993 | Karnopp |
| 5,211,452 A | 5/1993 | Okazaki et al. |
| 5,217,245 A | 6/1993 | Guy |
| 5,217,246 A | 6/1993 | Williams et al. ............ 280/707 |
| 5,229,955 A | 7/1993 | Nishiwaki et al. |
| 5,265,019 A | 11/1993 | Harara et al. |
| 5,288,101 A | 2/1994 | Minnett |
| 5,320,422 A | 6/1994 | Tsuyama et al. |
| 5,325,300 A | 6/1994 | Tsuyama et al. |
| 5,351,192 A | 9/1994 | Tsuyama et al. |
| 5,419,624 A | 5/1995 | Adler et al. |
| 5,421,644 A | 6/1995 | Prescott et al. |
| 5,423,391 A | 6/1995 | Shimizu |
| 5,431,431 A | 7/1995 | Fulks et al. |
| 5,447,364 A * | 9/1995 | Sakane et al. .............. 303/169 |
| 5,505,480 A | 4/1996 | Pascarella |
| 5,517,414 A | 5/1996 | Hrovat |
| 5,563,792 A | 10/1996 | Ander et al. |
| 5,774,821 A | 6/1998 | Eckert |
| 5,887,675 A | 3/1999 | Hackl et al. |
| 5,913,576 A | 6/1999 | Naito et al. |
| 5,918,951 A | 7/1999 | Rudd, III |
| 5,934,769 A | 8/1999 | Brachert et al. |
| 5,941,924 A | 8/1999 | Maisch |
| 5,944,392 A | 8/1999 | Tachihata et al. |
| 5,944,394 A | 8/1999 | Friederichs et al. |
| 5,952,564 A | 9/1999 | Naito et al. |
| 6,000,765 A | 12/1999 | Hinz et al. |
| 6,032,520 A | 3/2000 | Miyazaki |
| 6,044,319 A | 3/2000 | Rosendahl et al. |
| 6,115,663 A | 9/2000 | Yasuda |
| 6,125,319 A | 9/2000 | Hac et al. |

* cited by examiner

SYSTEM AND METHOD FOR REDUCING STOPPING DISTANCE AND IMPROVING TRACTION IN MOTOR VEHICLES

CROSS-REFERENCE TO RELATED APPLICATIONS

Continuation-in-part of U.S. patent application Ser. No. 09/356,075, filed Jul. 16, 1999 now ABN.

BACKGROUND OF THE INVENTION

The invention concerns a method and a system for reducing the stopping distance and improving the traction of a motor vehicle equipped with a roll stabilization system, wherein the roll stabilization system includes at least one actuating drive disposed on at least one axle and between the two halves of an undercarriage stabilizer.

Active roll stabilization (ARS) systems are well known in the art, and provide a means for preventing body tilt or roll during cornering by automatically adjusting an undercarriage-mounted stabilizer in response to appropriate, sensed conditions, or a manual input, being communicated to a controller. An ARS system for motor vehicles is known, and discussed in *Intelligenz fürs Fahrwerk* [*Intelligence for the Undercarriage*], *Konstruktion und Electronik* [Design and Electronics], No. 17, Aug. 5, 1992, at 9, the disclosure of which is expressly incorporated herein by reference. Where formerly a one-piece torsion bar or stabilizer would have been provided to the vehicle undercarriage to prevent body roll, the system described by this reference provides a hydraulic swivel motor or actuator drive between the two halves of the stabilizer, thereby providing a two-part undercarriage roll stabilizer system. That is, the conventional torsion bar or stabilizer is split, and disposed between the two stabilizer halves is a swivel drive motor that is able to produce an active torsion and therefore a tensioning of the stabilizer halves and the axles to which the stabilizer halves are engaged. The swivel motor, or actuator, induces relative rotary movement between the stabilizer halves to counteract the body roll, and suppresses the rolling motion of the vehicle superstructure during cornering by applying a countermoment to the superstructure. This moment may be advantageously generated in the stabilizers of the front and rear axles. With the aid of such a system, on the one hand, driving comfort is improved in that the rolling motion of the vehicle superstructure is suppressed, and moreover, the left and right sides of the vehicle can be decoupled when unilateral excitations from the road are encountered during cornering.

The aforesaid known system uses a hydraulic actuating drive that requires specialized and in some cases high-cost installation in the vehicle and that, furthermore, needs power even when the vehicle is traveling straight ahead or is quasi-stationary, with the result that so-called no-load losses occur even during straight-ahead driving.

Electromechanical actuating drives suitable for use in roll stabilization systems are also known. For example, Japanese Patent Application No. 06249927, filed Sep. 19, 1994, and published Apr. 2, 1996, as Abstract Publication No. 08085928; and German Patent Application No. DE 198 14 275 A1, filed Oct. 8, 1998, the priority of which is claimed in International Patent Application No. PCT/DE99/00930, filed Mar. 27, 1999, and published Dec. 29, 1999, as International Publication No. WO 99/67100, the disclosures of which are both expressly incorporated herein by reference, describe types of roll stabilizer system actuators which use DC motors as a power source, the motor selectively rotating the stabilizer halves relative to each other via reduction gearing.

Other examples of ARS systems are disclosed in U.S. Pat. Nos. 4,796,911 (Kuroki et al.); 4,892,329 (Kozaki et al.); 4,962,943 (Lin); 5,186,486 (Hynds et al.); 5,217,245 (Guy); 5,217,246 (Williams et al.); 5,288,101 (Minnett); 5,431,431 (Fulks et al.); and 5,505,480 (Pascarella), the disclosures of which are all expressly incorporated herein by reference.

When the brakes are applied in a vehicle traveling on a road where the left and right wheels are each encountering a different coefficient of friction, i.e., where the traction of the road surface is different on the left and the right sides (on so-called $\mu$-split-friction roads), it is difficult to achieve a balance between the left and right sides of the vehicle that will reduce stopping distance with conventional ABS technology.

There are methods and means well known to those of ordinary skill in the art for estimating, or measuring differences in, the coefficient of friction, slip or adhesion between tires of an automobile and the road surface. Some examples of such methods and means are described in U.S. Pat. Nos. 5,077,672 (Nobumoto et al.); 5,135,290 (Cao); 5,211,452 (Okazaki et al.); 5,229,955 (Nishiwaki et al.); 5,320,422 (Tsuyama et al.); 5,325,300 (Tsuyama et al.); 5,351,192 (Tsuyama et al.); 5,419,624 (Adler et al.); 5,421,644 (Prescott et al.); 5,563,792 (Ander et al.); and 5,774,821 (Eckert), the disclosures of which are all expressly incorporated herein by reference. Typically, as the disclosures of these patents point out, in response to a measured reduction in the coefficient of friction between at least one tire and the road surface, braking of a wheel and/or a reduction in fuel delivery to the engine is effected to control wheel slip or braking. Moreover, as indicated by the disclosures of the above patents, it is well known to those of ordinary skill in the art to compare coefficients of friction at different wheels by means an on-board process computer, which serves as a comparator, for carrying out such control, and to provide suitable and appropriately-located sensors for gathering data to be input to the computer.

SUMMARY OF THE INVENTION

It is, therefore, the task of this invention to provide a method and a system for reducing stopping distance and improving traction on road surfaces having different degrees of traction on the left and right sides with the use of a roll stabilization system.

To accomplish the aforesaid task, the invention proceeds from the idea of achieving a reduction of stopping distance and also, on the other hand, a gain in traction, during braking on road surfaces of different adhesion ($\mu$-split-friction roads) by diagonal tensioning of the actuating drives of a roll stabilization system.

In a vehicle equipped with a roll stabilization system, in addition to the possibility of leveling the vehicle superstructure by tensioning in the same direction, i.e., rotating the stabilizer halves in the same direction relative to their actuator, which is located between the front or rear wheel pairs, there is also the possibility of tensioning the actuating drives on the axles in opposite directions, i.e., diagonal tensioning. This measure is not associated with any tilt of the superstructure, but the tire/road contact forces of the wheels can be increased or decreased, as the case may be, across the vehicle diagonals. Thus, diagonal tensioning of the actuating drives refers to controlling the drives such that loads are placed on a first front wheel on one side of the vehicle and on a first rear wheel on the opposite side of the vehicle. That is, the weight of the vehicle superstructure (i.e., the sprung vehicle weight) is forced upward or lifted near its corners by these first front and rear wheels, for example on wheels Vr and Hl of vehicle 1 shown in FIG. 1. Simultaneously, this actuation removes part of the sprung vehicle weight load from the second front and rear wheels (e.g., wheels Vl and Hr), which are also diagonally opposite. Thus, the tire/road contact forces at the diagonally opposite first front and rear wheels is increased, the friction between these wheels and their respective ground surfaces being enhanced, and the tire/road contact forces at the diagonally opposite second front and rear wheels is decreased.

Since the transmissible longitudinal or circumferential force of the wheels behaves, within certain limits, proportionately to the tire/road contact force, the stopping distance can be sharply reduced by loading the front high-$\mu$ wheel and the rear low-$\mu$ wheel and simultaneously removing the load from the front low-$\mu$ wheel and the back high-$\mu$ wheel (a decrease in stopping distance of up to 15% was measured when braking from a speed of 110 km/h).

The yaw moment of the vehicle, which is intensified by the greater deceleration of the high-$\mu$ wheel, can be recovered from in a number of ways. A gradual tensioning of the actuating drives during braking gives the driver, for example, the opportunity to adjust to a larger compensating steering angle to the right, although some of the decrease in stopping distance is lost as a result.

When a vehicle is equipped with an automatic steering system or a steering support system that overrides the steering-wheel angle adjusted at the steering wheel with an additional steering angle determined by other parameters, the corresponding yaw compensation can take place during the intervention of the stopping-distance-reducing actuating drive of the respective steered axle as soon as the different road conditions are detected simultaneously with the loading of and the removal of the loads from the wheels to reduce stopping distance, thereby achieving the full effect of the reduction of stopping distance.

Traction can also be improved analogously to braking. In the case of acceleration, the system according to the invention can increase propulsive force by increasing the normal force on the low-$\mu$ wheel by means of the diagonal tensioning of the actuating drives on the axles.

The effect sought with the method and system according to the invention can be achieved not only with the use of one actuating drive per axle, but also with individual actuators for each wheel, as well as with other actuating-drive designs that do not include electromotor actuating drives, but instead operate, for example, hydraulically, pneumatically, and so forth.

Accordingly, the present invention provides a method for improving the traction between a road surface and a motor vehicle having a pair of front wheels and a pair of rear wheels which engage the road, each front wheel mounted on a front axle, each rear wheel mounted on a rear axle, one of the axles being a driven axle, and a two-part undercarriage roll stabilizer system including a front and a rear undercarriage stabilizer, each the undercarriage stabilizer comprising an actuating drive operatively coupled to a the pair of wheels, and for reducing the stopping distance along the road in which the motor vehicle can be stopped. The method includes: determining a coefficient of friction between at least two wheels and the road surface; comparing the coefficients of friction; and tensioning the actuating drives diagonally, the wheel contact forces between diagonally opposite wheels and the road surface thereby being one of increased and decreased in response to the determined coefficient of friction between a wheel and the road surface.

The present invention also provides a system for improving the traction between a road surface and a motor vehicle including front and rear axles, one the axle being driven, four wheels mounted on the axles, and a roll stabilizer system having a plurality of actuating drives and operatively connected to the axles, and for reducing the stopping distance along the road in which the motor vehicle can be stopped. The system includes a plurality of sensors, the coefficient of friction between each wheel and a road surface being measured by the sensors, and a comparator connected to the plurality of sensors, the measured coefficients of friction being compared by the comparator, the comparator connected to each the actuating drive. A front and a rear axle are diagonally tensioned by the actuating drives and the wheel contact forces of two diagonally opposite wheels are one of increased and decreased in response to differences in measured coefficients of friction.

The method and system according to the invention are explained in detail hereinbelow with reference to schematic illustrations of three different vehicle conditions.

BRIEF DESCRIPTION OF THE DRAWINGS

The above mentioned and other features and objects of this invention, and the manner of attaining them, will become more apparent, and the invention itself will be better understood, by reference to the following description of an embodiment of the invention taken in conjunction with the accompanying drawings, wherein.

Figure 1:
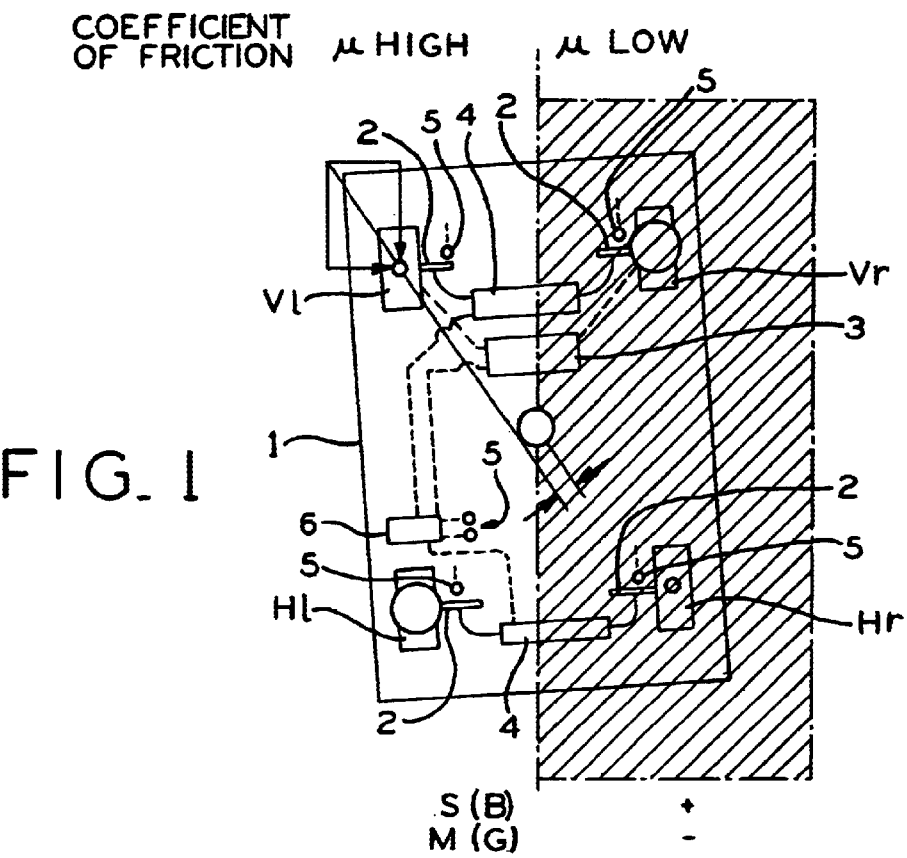
FIG. 1 is a plan view of a schematically represented vehicle being braked on a road having different coefficients of friction on the left and right sides, in which the procedure followed is the opposite of the method according to the invention.

Corresponding reference characters indicate corresponding parts throughout the several views. Although the drawings represent an embodiment of the present invention, the drawings are not necessarily to scale and certain features may be exaggerated in order to better illustrate and explain the present invention.

DETAILED DESCRIPTION OF THE INVENTION

According to FIG. 1, vehicle 1 with respective left and right front wheels Vl, Vr and respective left and right rear wheels Hl, Hr is traveling on a road where there is high coefficient of friction $\mu_{High}$ on the left and low coefficient of friction $\mu_{Low}$ on the right, as viewed in the direction of travel. The size of the dots or circles on the wheels symbolizes the relative magnitude of the tire/road contact force applied to the wheels by the roll stabilization system.

In an experiment, an additional load was imposed by the roll stabilization system present in the vehicle on the front low-$\mu$ wheel, i.e., right front wheel Vr, and the rear high-$\mu$ wheel, i.e., left rear wheel Hl, while load on the high-$\mu$ front wheel, i.e., left front wheel Vl, and the low-$\mu$ rear wheel, i.e., right rear wheel Hr, was simultaneously removed. As noted above, this procedure is the opposite of the method according to the invention.

The result was an undesirable increase in vehicle stopping distance S(B), and an undesirable decrease in yaw moment M(G), relative to the neutral condition discussed below with reference to FIG. 2. The parallelogram of forces indicated at left front wheel Vl shows that the reduced tire/road contact force of left front wheel Vl leads to a decrease in the transmissible circumferential force, and thus a decrease in vehicle stopping ability.

Figure 2:
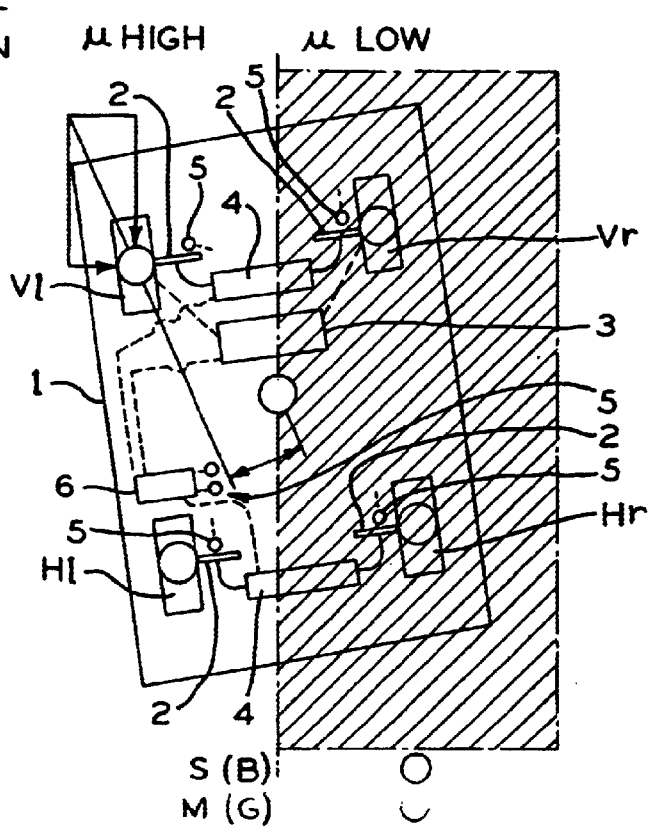
FIG. 2 is a plan view of a schematically represented vehicle being braked on a road with different coefficients of friction on the left and right sides, in which no measures have been taken to reduce stopping distance by means of a roll stabilization system.

FIG. 2 shows the condition of vehicle 1 during a braking attempt on the same road shown in FIG. 1, on which the coefficients of friction again differ between the left and the right, i.e., coefficient of friction $\mu_{High}$ is on the left side of the road and coefficient of friction $\mu_{Low}$ is on the right side of the road, as viewed in the direction of travel.

The tire/road contact force, here symbolized by the equal-sized dots or circles on the wheels, indicates that no measures for reducing stopping distance by means of a roll stabilization system are activated and the tire/road contact forces of the wheels are of equal magnitude. This means that the stopping distance S(B) and the yaw moment M(G) behave neutrally.

Figure 3:
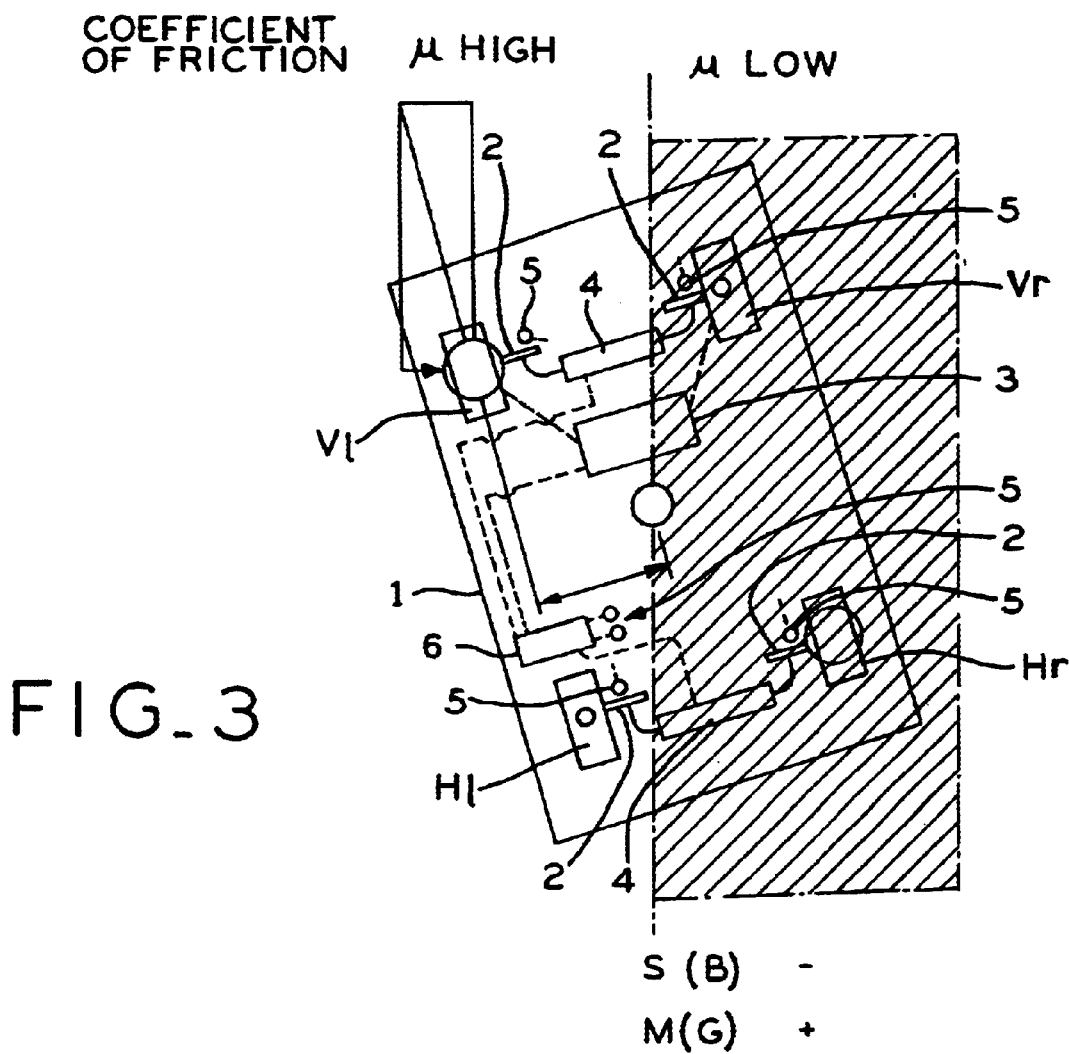
FIG. 3 is a plan view of a schematically represented vehicle being braked on a road with different coefficients of friction on the left and right sides, in which a roll stabilization system is being used in accordance with the method of the invention.

In FIG. 3, vehicle 1 is again braked on the road of FIG. 1, with high coefficient of friction $\mu_{High}$ on the left and low coefficient of friction $\mu_{Low}$ on the right, viewed in the direction of travel. As noted above, FIG. 3 represents utilization of the method according to the invention. In practicing the inventive methods, the different coefficients of friction $\mu_{High}$ and $\mu_{Low}$ are determined by measurement and comparison in a known way and, in the configuration shown, actuating drives 4 of the roll stabilization system on front and rear axles 2 are tensioned diagonally reciprocally in such a way that the front high-$\mu$ wheel, i.e., left front wheel Vl, and the rear low-$\mu$ wheel, i.e., right rear wheel Hr, are subjected to additional loading, and loads are simultaneously removed from the front low-$\mu$ wheel, i.e., right front wheel Vr, and the rear high-$\mu$ wheel, i.e., left rear wheel Hl. This is symbolized by the respective large and small circular dots or circles on the wheels. As a result, stopping distance S(B) is desirably decreased and yaw moment M(G) is simultaneously desirably increased, relative to the neutral condition discussed above with reference to FIG. 2. The parallelogram of forces indicated at left front wheel Vl shows that the increased tire/road contact force of left front wheel Vl leads to a increase in the transmissible circumferential force, and thus an increase in vehicle stopping ability. In an experiment conducted on a road with a split coefficient of friction $\mu$, as described above, a reduction in stopping distance of up to 15% was obtained by the inventive method. Further, analogously to braking, traction can also be improved by means of the roll stabilization system. In the case of acceleration, the propulsive force can be increased by increasing the normal force on the low-$\mu$ wheel of the driven axle 2, which is attached to front wheel Vr or rear wheel Hr.

Referring again to to FIG. 3, the increased yaw moment caused by the greater deceleration of the high-$\mu$ wheel, i.e., left front wheel Vl, can, for example, be recovered from in that by gradual tensioning of the actuating drives, the driver is given the opportunity to adjust to the larger compensating steering angle. However, some of the decrease in stopping distance is lost in the process.

If the vehicle is equipped with overriding automatic steering or steering support system 3 that enables it, for example, to set an additional steering angle on the steered wheels at the front or rear axle, the corresponding compensation for the yaw moment can take place as soon as the different road conditions are detected, e.g., by means of the differences in the braking pressure of the wheels, simultaneously with the loading of and the removal of the loads from the wheels by the roll stabilization system. Such overriding automatic steering or steering support systems are well known to those of ordinary skill in the art. Some examples of such systems, any one of which may serve as steering system 3, are described in U.S. Pat. Nos. 5,205,371 (Karnopp); 5,265,019 (Harara et al.); 5,423,391 (Shimizu); and 5,887,675 (Hackl et al.), the disclosures of which are all expressly incorporated herein by reference. The full effect of the reduction of stopping distance is achieved in this manner, for the actuating drives need not be tensioned so gradually in order to accommodate a large compensating steering angle.

In general, the effect according to the invention can be achieved not only with the use of one actuating drive per axle, but also with individual actuating drives for each wheel, as well as with other actuating-drive designs such as hydraulic and pneumatic actuating drives, for example.

A system carrying out the method according to the invention comprises sensors 5 which measure parameters indicative of the coefficients of friction $\mu$, or slip or adhesion between the individual wheels and the road, and which are connected to process computer 6 which determines and/or compares the sensed parameters in a manner such as disclosed in the above-incorporated references. For example, pressure estimates or pressure measurements of the wheel braking pressures can be performed, where appropriate, by means of the wheel rpm. Process computer 6 compares the coefficients of friction measured on the left with those measured on the right and determines how roll stabilization actuating drives 4 must be actuated in each case to effect the direction and degree of diagonal tensioning of the axles 2.

When vehicle 1 includes steering system 3 which can add an additional angle to the steering angle of the steered wheels set at the steering wheel, process computer 6 outputs to system 3 signals for yaw compensation simultaneously with the corrective signals for actuating drives 4 of the roll stabilization system that are generated to reduce stopping distance or improve traction. Vehicle 1 may then be better controlled without compromising its ability to stop and/or accelerate.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A method for improving the traction between a road surface and a motor vehicle having a pair of front wheels and a pair of rear wheels which engage the road surface, each front wheel mounted on a front axle, each rear wheel mounted on a rear axle, one of the axles being a driven axle, and a two-part undercarriage roll stabilizer system including a front and a rear undercarriage stabilizer, each the undercarriage stabilizer comprising an actuating drive operatively coupled to a the pair of wheels, and for reducing a stopping distance of the vehicle along the road a stopping distance of the vehicle, the method comprising:

determining a coefficient of friction between at least two wheels and the road surface;

comparing the coefficients of friction; and tensioning the actuating drives diagonally, such that the wheel contact forces between diagonally opposite wheels and the road surface thereby being one of increased and decreased in response to the determined coefficient of friction between a wheel and the road surface.

2. The method according to claim 1, further comprising increasing a load on a front wheel with substantially the highest coefficient of friction and on a rear wheel with substantially the lowest coefficient of friction, and simultaneously reducing a load on a front wheel with substantially the lowest coefficient of friction and on a rear wheel with substantially the highest coefficient of friction, whereby the stopping distance is reduced.

3. The method according to claim 1, further comprising increasing a load on a wheel having substantially the lowest coefficient of friction and mounted to the driven axle, whereby traction between that wheel and the road surface is increased.

4. A system for improving the traction between a road surface and a motor vehicle including front and rear axles, one said axle being driven, four wheels mounted on said axles, and a roll stabilizer system having a plurality of actuating drives and operatively connected to said axles, and for reducing a stopping distance of the vehicle along the road surface, said system comprising:

a plurality of sensors, the coefficient of friction between each wheel and a road surface being measured by said sensors; and a comparator connected to said plurality of sensors, the measured coefficients of friction being compared by said comparator, said comparator connected to each said actuating drive;

wherein a said front and a said rear axle are diagonally tensioned by said actuating drives and the wheel contact forces of two diagonally opposite wheels are one of increased and decreased in response to differences in measured coefficients of friction.

5. The system according to claim 4, wherein said comparator comprises a process computer.

6. The system according to claim 5, wherein at least a pair of said wheels are steered wheels having a variable steering angle, and further comprising an automatic steering system connected to said pair of steered wheels, the steering angle of said steered wheels being adjusted by said automatic steering system to offset a yaw movement of said vehicle generated by a greater deceleration of a wheel with substantially the highest coefficient of friction.

7. The system according to claim 6 wherein the steering angle is adjusted by said automatic steering system substantially simultaneously with said front and rear axles being diagonally tensioned by said actuating drives.

* * * * *

UNITED STATES PATENT AND TRADEMARK OFFICE
CERTIFICATE OF CORRECTION

PATENT NO.      : 6,663,113 B2
DATED           : December 16, 2003
INVENTOR(S)     : Armin Schulke et al.

It is certified that error appears in the above-identified patent and that said Letters Patent is hereby corrected as shown below:

<u>Column 7,</u>
Line 1, after the word "road" add -- surface -- and delete "a stopping distance of the vehicle"

Signed and Sealed this

Twenty-fourth Day of February, 2004

JON W. DUDAS
*Acting Director of the United States Patent and Trademark Office*